June 2, 1964  E. R. WIGAN  3,135,506
SHOCK-ABSORBERS AND THE LIKE
Filed Dec. 29, 1960

Inventor:
Edmund Ramsay Wigan,
By his attorneys,
Baldwin & Wight

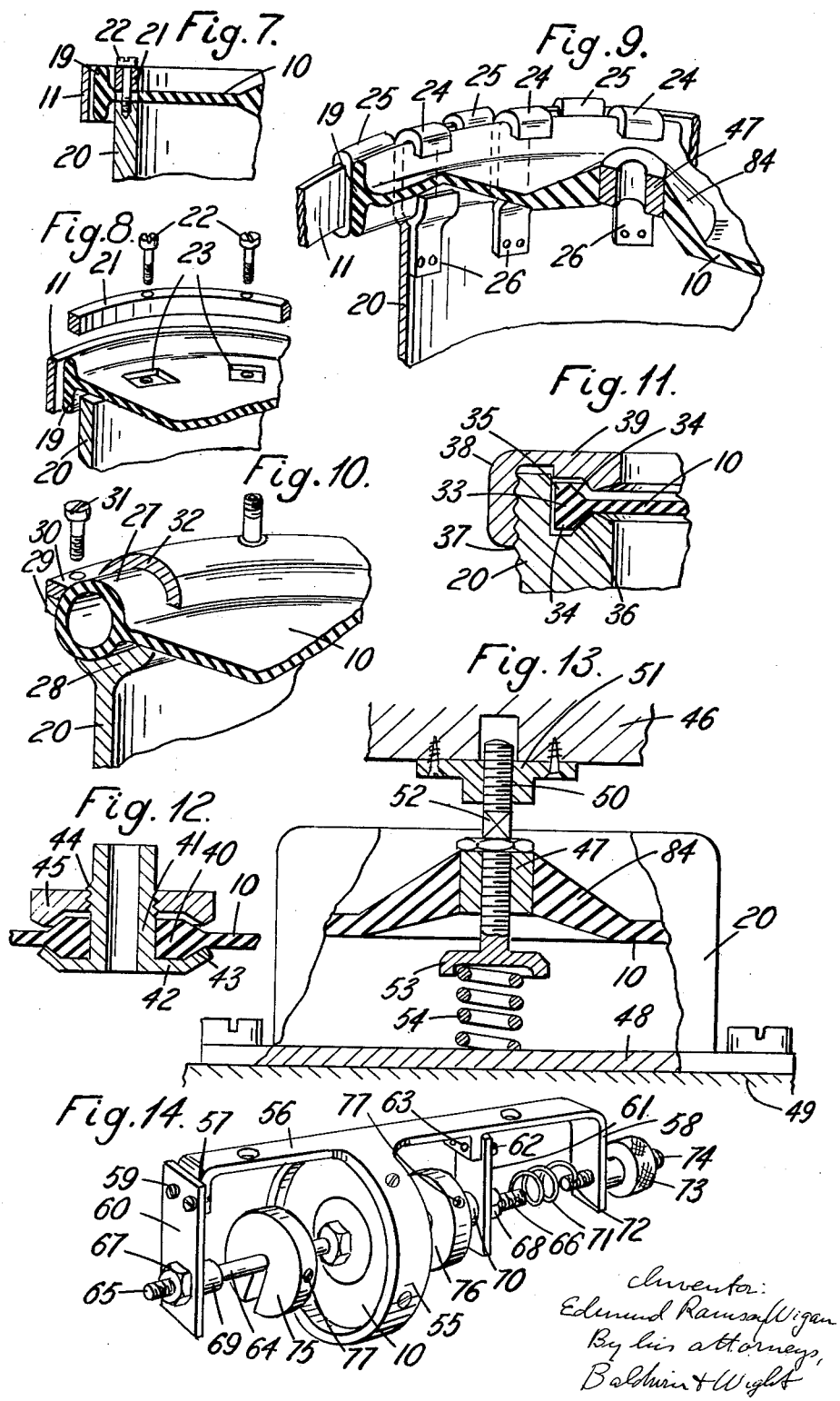

June 2, 1964 E. R. WIGAN 3,135,506
SHOCK-ABSORBERS AND THE LIKE
Filed Dec. 29, 1960 3 Sheets-Sheet 3

INVENTOR.
EDMUND RAMSAY WIGAN
BY Baldwin & Slight
ATTORNEYS

United States Patent Office 3,135,506
Patented June 2, 1964

3,135,506
SHOCK-ABSORBERS AND THE LIKE
Edmund Ramsey Wigan, "Kerry," Barnham,
Sussex, England
Filed Dec. 29, 1960, Ser. No. 79,433
Claims priority, application Great Britain Dec. 30, 1959
2 Claims. (Cl. 267—1)

This invention relates to devices of the kind embodying spring means for absorbing mechanical shocks and vibrations and one of the objects is to provide means whereby a predetermined stiffness characteristic of the spring means may be obtained.

According to this invention a device of the kind embodying spring means for absorbing mechanical shocks and vibrations is characterised in that said spring means comprise a resilient body the periphery of which is held against movement and in that there are provided means for generating a predetermined compressive stress between said periphery and a central location and means for transmitting the shock or vibration to the body transversely to the direction of the compressive stress. The dimensions of the body transverse to the direction of application of said shock and vibration will usually be substantially greater than the thickness of the body in each direction of application and for convenience the body is hereinafter referred to as a diaphragm. With this arrangement the device can be applied to an existing machine or apparatus without compromising the fixing centres of the machinery or apparatus which is supported by the device. Thus the device may act not only as a shock absorbing mounting but also as a vibration damper which while it does not support any substantial loads is attached to the vibrating body, and dissipates some of the vibrational energy in the form of heat generated within the material of the flexible diaphragm. In this form, advantage is taken of the ease with which the resonant frequency of the assembly can be adjusted in situ over a considerable range by adjusting the radial compressive stress thus modifying the stiffness characteristics of the diaphragm.

The diaphragm may be formed from a natural rubber or a material having characteristics similar to those of natural rubber, the required characteristics being an ability to deform resiliently under stress combined with the ability to generate internally a certain amount of heat when rapidly deformed and thus has considerable mechanical hysteresis which latter feature is exploited in constructions which are specifically designed to damp out oscillations of the diaphragm.

Preferably the diaphragm comprises a solid of revolution which includes parts which may be flat, conical or partly spherical and the means for generating the predetermined compressive stress is arranged to direct it radially and the means for transmitting the shock and vibration applies it to the diaphragm in a direction which is either coaxial with the axis of the solid of revolution or parallel with said axis so that the diaphragm develops a desired stiffness characteristic with reference to the axially directed shock or vibration.

Various means may be provided for applying the aforesaid radial compressive stress to the diaphragm, for example, the adjustable means for applying such radial compressive stress may comprise a contractible ring encircling the periphery of the diaphragm.

Preferably the peripheral portion of the diaphragm is increased in cross-section with respect to the adjoining portion of lesser radius so as to provide a substantial peripheral area to be gripped by said ring.

Alternative means for producing the aforesaid radial compressive stress comprise means for compressing the material of the diaphragm in an axial direction at a central location diaphragm and/or at a location around a peripheral portion of the diaphragm so as to cause the material in that location to flow radially while remaining resilient and means for restraining that periphery of the diaphragm against radial expansion.

The means for compressing the material of the diaphragm may comprise clamping members arranged on opposite sides of the peripheral portion and/or central portion of the diaphragms and means for drawing the clamping members towards one another.

Alternatively in an arrangement having thickened peripheral and/or central portions the said portion or portions may be hollow and may be disposed between rigid abutment faces and is or are also provided with valve means and the means for compressing the material may comprise means for forcing fluid into or withdrawing it from said hollow portion or portions through said valve means.

When the diaphragm has been subjected by any of the above means to the requisite radial compressive stresses, comparatively small movements of the means which apply the vibrational forces to the diaphragm produce a comparatively large degree of relative motion between the particles of the diaphragm material and redistribution of the stresses therein.

Spring means may be provided for modifying the deflection characteristics of the diaphragm in an axial direction. Thus in the case where the weight of a body is supported by the assembly the deflection of the system may be determined either partly or wholly by the spring means. Thus the compressive stresses developed in the diaphragm may be such that it has a negative stiffness to forces directed axially, whereas the positive stiffness of the spring means may be chosen so as to be of the same order as the negative stiffness of the stressed diaphragm so as to produce a small overall positive incremental stiffness or even no incremental stiffness at all i.e. a condition in which the diaphragm and spring combination will exert, in any position after deflection over a certain finite range of deflection, a substantially constant resisting force.

Preferably adjustable means are provided for pre-loading the spring means so that they carry the greater part of the weight of the assembly supported by the diaphragm, the pre-loading being made adjustable which will bring the associated diaphragm into the preferred state of deformation.

In one arrangement designed as a vibration damper there is provided in combination with the parts as set out above a system having a natural period of vibration having the required relationship to the vibration to be damped and means for connecting said vibratory system to said diaphragm, the radial stress in which diaphragm is adjusted until the diaphragm has a required stiffness and/or damping characteristics.

The following is a more detailed description of a number of embodiments of the invention and of their mode of operation, reference being made to the accompanying drawings in which:

FIGURES 7 and 8 show details of an arrangement of applying the radial stress in a similar manner to that of FIGURES 1 to 4;

FIGURE 9 is a modification of the arrangement shown in FIGURES 7 and 8;

FIGURE 10 is a diagrammatic section through a part of alternative means for applying radial stress by hydraulic of pneumatic means to the diaphragm;

FIGURE 11 is a somewhat similar arrangement shown in FIGURE 10 for applying a compressive radial stress by mechanical means applied at the periphery of the diaphragm;

FIGURE 12 is a section through a part of the diaphragm showing mechanical means for applying radial stresses from the centre of the diaphragm in a manner similar to that shown in FIGURE 6;

FIGURE 13 is a section through one form of the device arranged for supporting and shock insulating a load;

FIGURE 14 is a diagrammatic perspective view of the invention as applied to a vibration damper.

Figure 1:
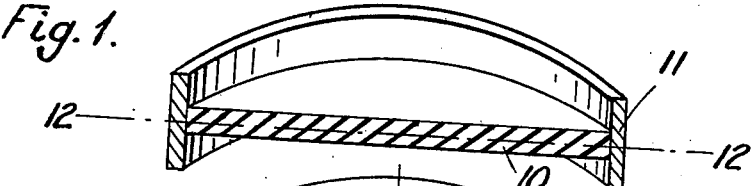
FIGURES 1 to 4 are diagrammatic or symbolic perspective sectional views which show approximately the different shapes a simple disc shaped diaphragm might assume before and after being stressed in accordance with the invention and when deflected by an external force.

Referring to FIGURES 1 to 4, there is illustrated a diaphragm 10 without any fixing means either at its centre or circumference and without any resilient reinforcements which diaphragm is in the form of a comparatively thick disc of rubber or rubber like material which is encircled by a contractible band 11. FIGURE 1 shows the diaphragm in an unstressed and undeflected condition. The initial natural plane of the diaphragm 10 is indicated at 12.

Consider first the behaviour of the diaphragm 10 when the spring indicated at 19 is absent. Imagine that a force is applied vertically to the centre of the diaphragm as indicated symbolically by the vertical arrow; (it will be understood that in practice any such force would be distributed over a significant area of the diaphragm, and that furthermore the diagrams are in other respects no more than broadly indicative of the real state of affairs). The three diagrams 2, 3 and 4 give a general impression of what would happen if the deflecting force were slowly increased.

Figure 2:
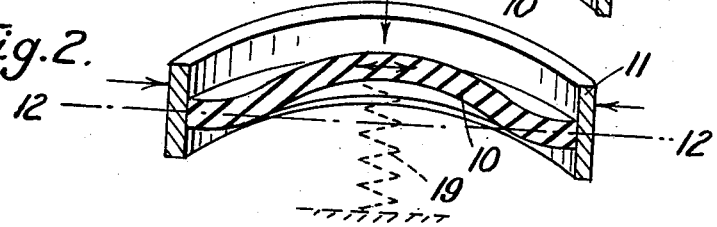
Figure 3:
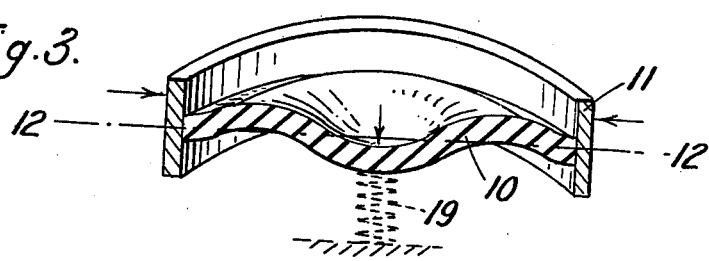
Figure 4:
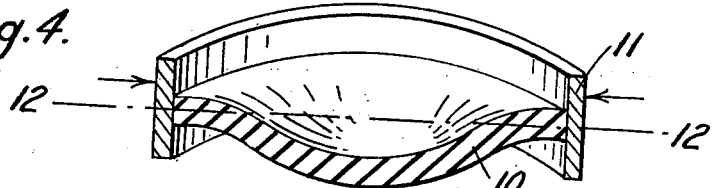

In FIGURE 2 the downward force is assumed to be extremely small; in FIGURE 3 it has become larger; and in FIGURE 4 the diaphragm has taken a new, stable, position as the result of passing through the intermediate position of FIGURE 3. The behaviour of the diaphragm when in this roughly central position—which for the purposes of this specification will be referred to as "the position of symmetry"—has particular application in this invention.

The incremental stiffness of the diaphragm, when in this conformation, is a minimum. Moreover this minimum value will depend upon the amount by which the diaphragm has been compressed radially by the contractile band 11; if the compression is small, the minimum stiffness will be positive and only slightly less than the incremental stiffness which would be measured in FIGURE 2; if the compression is made large enough, the incremental stiffness in FIGURE 3 will become virtually zero. At this stage any further increase of compression will make the minimum value negative, that is to say, no increment of deflecting force will be needed to move the diaphragm further, but rather a restraining force will be needed to prevent such movement. Thus if the compressive force has been increased beyond the critical value, the diaphragm will move without any external aid from the position of FIGURE 3 to that of FIGURE 4. As will be explained later a spring such as 19 may be introduced to prevent such run-away conditions supervening; it also serves other purposes.

Now when negative stiffness appears in a mechanical system it is always attributable to the storage of potential energy in the system at some prior stage of its history; in this example there are two sources from which the energy can be drawn, one is the effort expended in setting up the radial compressive stress in the diaphragm, and the other is the work done by the vertically-directed force in causing the diaphragm to change from the shape in FIGURE 2 to that in FIGURE 3; the depression of the central area not only stores energy by further increasing the compressive force within the thickness of the sheet, but also stores further energy in the bending of the surface of the sheet.

When the diaphragm passes through the position of symmetry (FIGURE 3) not all this energy is released usefully—some of it is expended in heat, due to the inefficiency of the mechanical processes described. In a diaphragm of given dimensions the amount of energy expended as heat, when the diaphragm is caused to deflect axially, is large if the negative stiffness is large; thus the energy-loss may be altered by altering the radially-directed compressive force exerted on the diaphragm. The energy-loss associated with a given degree of negative stiffness can be modified by changing the composition and/or the cross-sectional shape of the diaphragm.

An assembly exhibiting a high degree of energy-loss is particularly suitable for a vibration-absorber.

The negative stiffness has, however, an additional function such as when the diaphragm is associated with a conventional (positively stiff), spring as will be explained in what follows.

Figure 5:
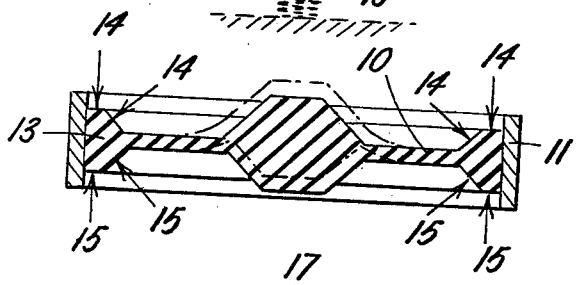
FIGURES 5 and 6 are also diagrammatic or symbolic sectional views showing alternative means for applying the radial compressive stress to the diaphragm.
Figure 6:
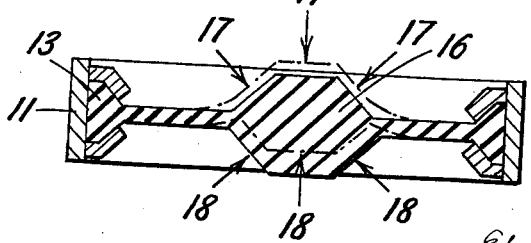

The same general conditions apply with a diaphragm stressed in the manner shown in FIGURES 5 and 6. In FIGURE 5 the periphery of the diaphragm 10 is thickened at 13 and is encircled by a band 11 which is not contractible. Radial compressive stresses are generated in the diaphragm by applying axial opposed forces 14 and 15 on opposite sides of the peripheral portion 13 causing the diaphragm to be bowed in an upward direction (as indicated by dotted lines) away from its unstrained position as indicated by the full lines.

In FIGURE 6 the axial compressive stresses are generated in the diaphragm by applying opposite axial forces such as 17 and 18 to the thickened central portion and still confining its thickened peripheral portion 13 by a non-contractible band 11. Various specific methods for imparting the required axial forces indicated in FIGURES 5 and 6 are referred to later.

By adding a compressive helical spring 19 as shown in dotted lines in FIGURES 2 to 4 the assembly of those figures can be made capable of carrying a load in spite of the negative stiffness of the diaphragm. If the stiffness of the spring is equal and opposite to the negative stiffness of the deformed diaphragm, axially directed forces applied to the centre of the diaphragm (in addition to the steady load) will experience (for small displacements) nothing but purely resistive opposition, that is to say the reaction of the assembly to forces applied between the limits of deflection will be represented by a force proportional to the velocity with which the point of application of the force moves to and from the plane 12, and oppositely directed.

It can further be arranged that the spring 19 when the diaphragm reaches the position of symmetry shown in FIGURE 3 the positive stiffness of the spring balances the negative stiffness of the diaphragm. In this way the load can be supported and at the same time violent movement of the load is hindered and an associated vibration damped out by the energy-loss in the diaphragm.

The simple form of disc diaphragm as shown in FIGURES 1 to 4 is not particularly suitable when the compressive radial stresses are large and/or when the load is considerable unless special arrangements are made for retaining the periphery of the diaphragm within the contractible band 11. This may be achieved by thickening the peripheral portion of the ring as shown in FIGURE 5. This gives more precise location of the periphery of the diaphragm within the contractible ring while leaving freedom of movement of the central area. Again when heavy loads require to be carried by the diaphragm it may be more efficient to use a diaphragm with cone shaped surfaces with relatively thick walls as shown in FIGURE 13 and referred to later. In such a construction a change in the radial compression stresses will alter the angle of the cone and curve the surface, and will also modify the stresses which will occur within the material of the cone when an axial force is applied.

The cone shaped surface has been mentioned above but merely as an example, other surfaces of revolutions can be used to obtain different performance characteristics. Again it has been implied that the sheet is of uniform thickness but this again may be modified to alter the stiffness and/or the resistance characteristics.

Again more than one diaphragm may be used in a shock absorbing assembly for instance, to take a simple case, there may be two disc like diaphragms both held in the same contractible band and having a common rigid connection at their centres. The connection may be adjustable in length so that each diaphragm can be buckled slightly towards or away from the other (when carrying no load) then the stiffness characteristics of the two discs will be different but so far as the overall stiffness of the assembly is concerned they will be additive and for this reason non-linearity in the response to the applied force will be cancelled to some extent.

Turning now more to the details of construction, FIGURES 7 and 8 show an arrangement suitable for applying radial compressive stresses by contraction of the band encircling the diaphragm as described with reference to FIGURES 1 to 5. In FIGURES 7 and 8 the periphery of the diaphragm is enlarged at 19 and the diaphragm 10 is supported by the upper part of the casing 20 which is fixed to a support (not shown). The casing may house an adjustable spring 54 which is associated with the diaphragm as shown in FIGURE 13. The enlarged peripheral portion 19 overlaps the outer surface of the casing part 20 and also overlaps the outer surface of a ring 21 secured to the casing by screws 22 which pass loosely through holes 23 in the diaphragm. The enlarged peripheral portion 19 of the diaphragm is encircled by the aforesaid contractible attaching band 11 which may be of a known kind comprising a strip of metal having overlapping ends, one of which has mounted upon it a rotatable screw which engages a thread on the surface of the other part thus providing a drive somewhat of the nature of a worm and worm wheel gear.

In the construction shown in FIGURE 9 the diaphragm 10 is provided with an upwardly extending thickened conical portion 84 having bonded into it a metal sleeve 47 by which the load is applied and having an enlarged peripheral portion 19 the lower portion of which overlies the outside of the top of the casing 20. The enlarged portion is encircled by a contractible attaching band 11, and is supported on, and secured to the casing 20 which is provided with upwardly extending lugs 24 which are curved over the top of the enlarged portion 19 of the diaphragm and with internal clamps in the form of lugs 26. The contractible strip has threaded on it a number of sleeve portions 25 which bear on the outside of the enlarged peripheral portion 19 so that when the strip is drawn tight the sleeve forces the enlarged portion against the inner surfaces of the elements 24 and 26.

In the arrangement shown in FIGURE 10 the peripheral portion 27 of the diaphragm 10 is formed with a tube which is filled with suitable fluid through a valve (not shown) and the radial compressive stress in the diaphragm modified by altering the fluid pressure. The upper part of the cylindrical casing 20 is formed with an attaching channel 28 for accommodating the tubular periphery of the diaphragm and having a flange 29 against which may be clamped a flange 30 by means of clamping screws 31. The flange 30 is formed integrally with a curved capping attaching piece 32 encircling the top of the tubular portion 27. Thus by increasing the pressure in the fluid, part of the material of the tubular portion of the diaphragm, which may be of rubber, is caused to spread inwardly into the adjacent parts of the diaphragm thus producing the aforesaid radial compressive stresses.

In the arrangement shown in FIGURE 11 the peripheral portion of the resilient diaphragm element 10 is enlarged at 33 so as to have inner conical faces 34 and an outer cylindrical face 35, the lower part of the enlarged portion is accommodated in a groove 36 in the upper part of the casing 20, which groove is similarly shaped to the enlargement and the casing is externally threaded at 37 and receives an internally threaded attaching rim portion 38 of an annulus or cap 39. By screwing up the cap the peripheral portion is compressed imparting radial compressive stress to the diaphragm.

In the arrangement shown in FIGURE 12 the diaphragm 10 is provided with a thickened central portion 40 which is formed with a hole through which extends a tubular metal part 41 having an attaching flange 42 which underlies the thickened portion and both it and the thickened portion are provided with abutting conical faces 43. A portion of the tubular part above the thickened portion is threaded at 44 to receive a clamping or attaching nut 45, the underface of which nut is similarly shaped to the thickened portion, thus by tightening the nut the material of the diaphragm 10, which may be of rubber, is arranged to spread outwardly and to impart the aforesaid radial compressive stress to the diaphragm. The tubular part 41 is arranged for connection to the load. Alternatively the compressive radial stress in the diaphragm may be controlled from the centre by making the thickened portion 40 hollow and providing it with a valve so that the pressure within it may be varied by the introduction or withdrawal of fluid which thickened portion is retained between the flange 42 and nut 45.

The arrangement shown in FIGURE 13 is suitable for supporting a load subject to vibrations which it is desired to damp out. The vibration damper comprises a diaphragm element 10 having a central conical portion 84 as in the arrangement of FIGURE 9 and which is formed from rubber in which is moulded an internally threaded attaching boss 47.

The diaphragm may be secured around its periphery to the casing or housing 20 in any of the ways referred to above, that is as shown in FIGURES 7 and 8, or as shown in any of FIGURES 9, 10 and 11 respectively. The casing, i.e. housing is provided with a base part 48 arranged to be fixed to a support 49.

The load 46 is supported on the thickened conical portion 84 by a threaded spindle 50 which serves as a load transmitting member and engages threads in a part 51 secured to the load 46 and which spindle also engages the threaded boss 47. Alternatively, the centre part of the resilient element 10 may be thickened and connected to load supporting means as shown in FIGURE 12.

The centre part of the spindle is flattened at 52 enabling the spindle to be rotated and in so doing the spindle screws out of the part 51 into the boss 47 at the same rate so that the distance apart between the load and the diaphragm is not varied.

The lower end of the threaded spindle is provided with an abutment 53 which engages the upper end of a compression spring 54 the lower end of which engages the base 48, thus by rotating the spindle the force exerted by the spring 54 may be varied in accordance with the load to be supported.

The radial compressive stresses in the diaphragm may be increased to reduce the diaphragm stiffness, also the thrust exerted upwards by the spring 54 may be altered, until at the point where the stiffness of the diaphragm is negative and annuls the stiffness of the spring 54, the load is supported by spring 54. The efficiency of shock insulation is then a maximum. The natural frequency of oscillation of the load 46 is zero when so mounted.

If the load comprises a machine coupled to parts on a fixed support these adjustments result in the position of the machine 46 varying and interfering with the operation of said parts and means may be provided to correct this for instance by adjusting the casing 20 in an up and down direction in relation to the support 49, or in the example illustrated in FIGURE 13, by releasing the element 51 from 46 and rotating it about the spindle 50 before returning it to 46.

Figure 15:
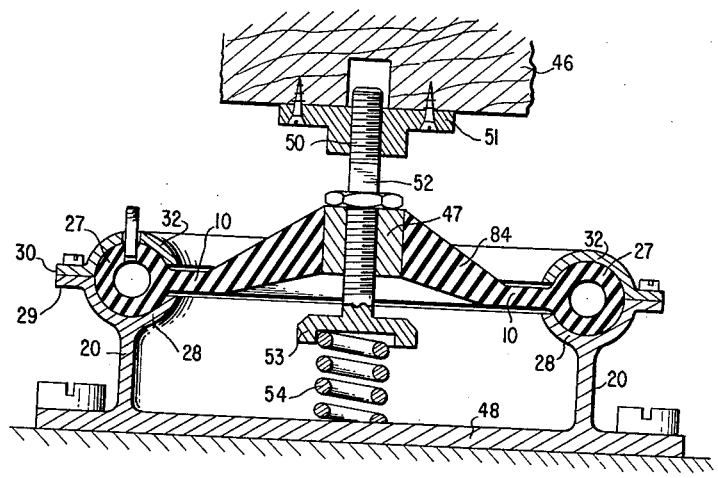
FIGURE 15 is a view similar to FIGURE 13, but showing a structure as illustrated in FIGURE 10 for attaching the peripheral part of a resilient element having its centre part attached as shown in FIGURE 13.

FIGURE 15 shows a construction in which the centre part of the resilient diaphragm element is attached to the load supporting spindle 50 as in FIGURE 13, and the peripheral part of the resilient diaphragm element is attached as in FIGURE 10 with provision for subjecting the interior of the hollow portion 27 to fluid pressure for compressing the resilient material and causing it to spread inwardly into adjacent parts of the diaphragm and thus to produce radial compressive stress.

So far described the invention is assumed to be applied for the purpose of carrying a load as well as acting as a shock absorber. However, there are many applications in which the second function alone is called for, for instance, as a vibration damper.

The systems so far described are arranged to have negligible at least small residual stiffness but for a vibration damper a significant positive stiffness is needed, moreover it must be continuously variable so that the damper may be tuned over a significant range of frequency.

It has been pointed out above that the most efficient way of obtaining mechanical resistance by deflection of a diaphragm is to hold it in a position such as is shown in FIGURE 3 when for small deflections the diaphragm has negative stiffness, It can be held, for example, in this position by two springs attached to the centre of the diaphragm acting in opposite directions.

If the total stiffness of the two springs exceeds the negative stiffness of the diaphragm, the system is stable and may have the required positive stiffness, moreover the overall stiffness may be altered by biasing the springs one way or the other and thus modifying the negative term. This provides a fine tuning control.

Alternatively, or additionally control may be obtained by altering the radial compressive stresses.

One example of such an arrangement is shown in FIGURE 14. In this arrangement an assemblage such, for example, as shown in FIGURES 7 and 8 is mounted in a cage 55 having a strip-like part 56 the ends of which arm are bent downwardly at 57, 58.

Secured to the portion 57 by screws 59 is a leaf spring 60 and a further leaf spring 61 is secured by screws 62 to a downwardly extending lug 63 on the strip-like element.

Secured to the blade spring 61 is a spindle 64 which is threaded at 65, 66 to receive nuts 67, 68 and the blade springs are clamped between these nuts and enlargements 69, 70 on the spindle.

The right hand end of the spindle 64 has secured to it one end of a helical spring 71 the other end of which is connected to an anchorage 72 which may be moved longitudinally with respect to the flange 58 by an adjusting nut 73 which engages a threaded part 74 of the anchorage.

The spindle 64 is adapted to receive weights of which two 75, 76 are shown on opposite sides of the diaphragm 10 and which are secured to the spindle by screws 77.

The natural frequency of the spring blades and weights 75, 76 is chosen so as to tune the system very approximately in accordance with the frequency of the vibrations it is required to damp out.

The internal radial compressive stresses of the diaphragm 10 are then adjusted to improve the tuning, and the tuning is completed by adjusting nut 73, as already described.

Although in the above arrangements the load is shown as being supported by the assemblage, the assemblage might be inverted and the load slung from the diaphragm in which case the additional spring would be a tension spring.

I claim:
1. An assembly for absorbing mechanical shocks and damping vibrations comprising a resilient element having a peripheral portion, a housing supporting the peripheral portion of the resilient element, attaching means for securing said peripheral portion to said housing, a spring disposed between a central area on said resilient element and a part of the housing so as to modify the deflecting characteristics of said resilient element, a load transmitting member, and attaching means for securing said member to a centre part of said resilient element, one of said attaching means being adjustable so as to apply and maintain radial compression to said element whether or not the load is applied to it by said load transmitting member, said resilient element having a hollow thickened portioned over a limited area thereof, and said one of said attaching means comprising rigid abutment faces between which said hollow thickened portion is disposed, and valved means for introducing fluid under pressure into and withdrawing it from said hollowed thickened portion thereby variably to compress the material of said resilient element at said limited area.

2. An assembly according to claim 1 in which said hollow thickened portion and said abutment faces are at the peripheral portion of said resilient element.

References Cited in the file of this patent
UNITED STATES PATENTS

| | | |
|---|---|---|
| 2,760,747 | Mordarski | Aug. 28, 1956 |
| 2,836,414 | MacLean | May 27, 1958 |
| 2,942,872 | Muller | June 28, 1960 |
| 2,973,953 | Fikse | Mar. 7, 1961 |
| 3,008,703 | Slemmons et al. | Nov. 14, 1961 |

FOREIGN PATENTS

| | | |
|---|---|---|
| 204,844 | Austria | Aug. 10, 1959 |
| 1,138,185 | France | Jan. 21, 1957 |
| 536,164 | Italy | Nov. 24, 1955 |